United States Patent
Kämpf

(10) Patent No.: US 11,379,053 B2
(45) Date of Patent: Jul. 5, 2022

(54) DETERMINATION OF WRITING DIRECTION BY MEANS OF INERTIAL SENSORS

(71) Applicant: STABILO International GmbH, Heroldsberg (DE)

(72) Inventor: Karl-Peter Kämpf, Röttenbach (DE)

(73) Assignee: STABILO International GmbH, Heroldsberg (DE)

( * ) Notice: Subject to any disclaimer, the term of this patent is extended or adjusted under 35 U.S.C. 154(b) by 0 days.

(21) Appl. No.: 16/644,991

(22) PCT Filed: Sep. 7, 2018

(86) PCT No.: PCT/EP2018/074111
§ 371 (c)(1),
(2) Date: Mar. 6, 2020

(87) PCT Pub. No.: WO2019/048600
PCT Pub. Date: Mar. 14, 2019

(65) Prior Publication Data
US 2020/0278760 A1    Sep. 3, 2020

(30) Foreign Application Priority Data
Sep. 7, 2017   (DE) .......................... 202017105404.7

(51) Int. Cl.
*G06F 3/0346*    (2013.01)
*G06F 3/0354*    (2013.01)
*G06F 3/038*     (2013.01)

(52) U.S. Cl.
CPC .......... *G06F 3/0346* (2013.01); *G06F 3/0383* (2013.01); *G06F 3/03545* (2013.01)

(58) Field of Classification Search
CPC ... G06F 3/0346; G06F 3/03545; G06F 3/0383
See application file for complete search history.

(56) References Cited

U.S. PATENT DOCUMENTS 5,902,968 A *  5/1999  Sato .................... G06F 3/03545
                                                    178/19.01
9,696,859 B1 *  7/2017  Heller .................. G06F 3/0346
(Continued)

FOREIGN PATENT DOCUMENTS

DE          19636835           3/1998
DE         102014106837       12/2018
(Continued)

OTHER PUBLICATIONS

Hans-Leo H. M. Teulings and Arnold J. W. M. Thomassen, Computer-Aided Analysis of Handwriting Movements, Visible Language, 1979, pp. 218-231, XIII 3.

*Primary Examiner* — Jeff Piziali
(74) *Attorney, Agent, or Firm* — Bradley Arant Boult Cummings; Timothy L. Capria; Alexandra C. Lynn

(57) ABSTRACT

The invention relates to Electronic pen (100) with pen position detection, comprising at least a writing lead, at least one electric voltage source, at least one digital processing unit, at least one data transfer module, and an inertial position detection sensor system for determining the location and movement of the electronic pen (100), wherein the electronic pen (100) is configured for an initial specification of a writing coordinate system with two axes X, Y (107, 108) being orthogonal to each other on a two-dimensional writing substrate (106) and with an axis Z being perpendicular to the two-dimensional writing substrate, characterized in that the inertial position detection sensor system is configured for the determination of accelerations and acceleration profiles of the electronic pen along the X-axis (107) and along the Y-axis (108) for a plurality of pairs of different axis orientations of the X-axis and Y-axis on the writing substrate (106), whereby for each pair of axis orientations, the axis orientation of the X-axis (107) and the axis orientation of the Y-axis (108) are orthogonal to each other, and wherein the (Continued)

Figure 4:
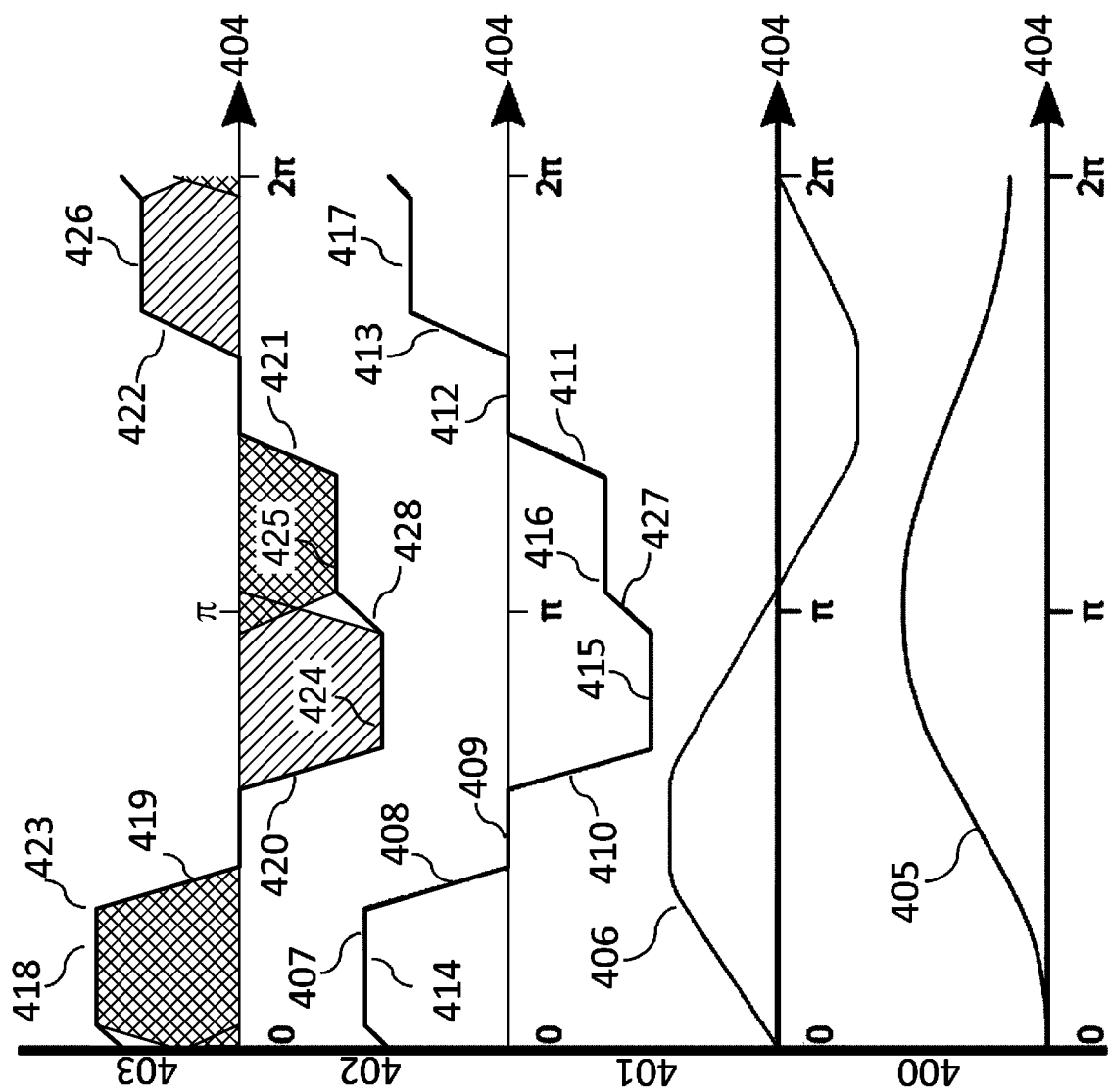

digital processing unit is configured for determining a writing direction based on the determination of at least one characteristic property of an acceleration profile (312) determined by the inertial position detection sensor system.

20 Claims, 4 Drawing Sheets

(56) References Cited

U.S. PATENT DOCUMENTS

| | | | | |
|---|---|---|---|---|
| 2012/0020566 A1* | 1/2012 | Yamanouchi | ........... | G06F 3/033 |
| | | | | 382/187 |
| 2013/0307459 A1* | 11/2013 | Tian | ..................... | G05B 19/416 |
| | | | | 318/570 |
| 2016/0154484 A1* | 6/2016 | Kampf | ................ | G06F 3/03545 |
| | | | | 345/179 |
| 2016/0154485 A1* | 6/2016 | Kampt | .................. | G06F 3/0346 |
| | | | | 345/179 |
| 2017/0083118 A1 | 3/2017 | Kampf | | |
| 2017/0115756 A1 | 4/2017 | Kampf | | |
| 2017/0371450 A1* | 12/2017 | Heller | .................. | G06F 1/1694 |

FOREIGN PATENT DOCUMENTS

| | | | | |
|---|---|---|---|---|
| DE | 102014106839 | | 2/2019 | |
| JP | 07200127 | | 8/1995 | |
| JP | 09230997 | | 9/1997 | |
| JP | 10301702 | | 11/1998 | |
| JP | 2017516252 | | 6/2018 | |
| KR | 1020090083212 | | 8/2009 | |
| KR | 20160146926 | | 12/2016 | |
| WO | 200207424 | | 1/2002 | |
| WO | 2015173408 | | 11/2015 | |
| WO | WO-2015173408 A1 | * | 11/2015 | ......... G06F 3/03545 |

* cited by examiner

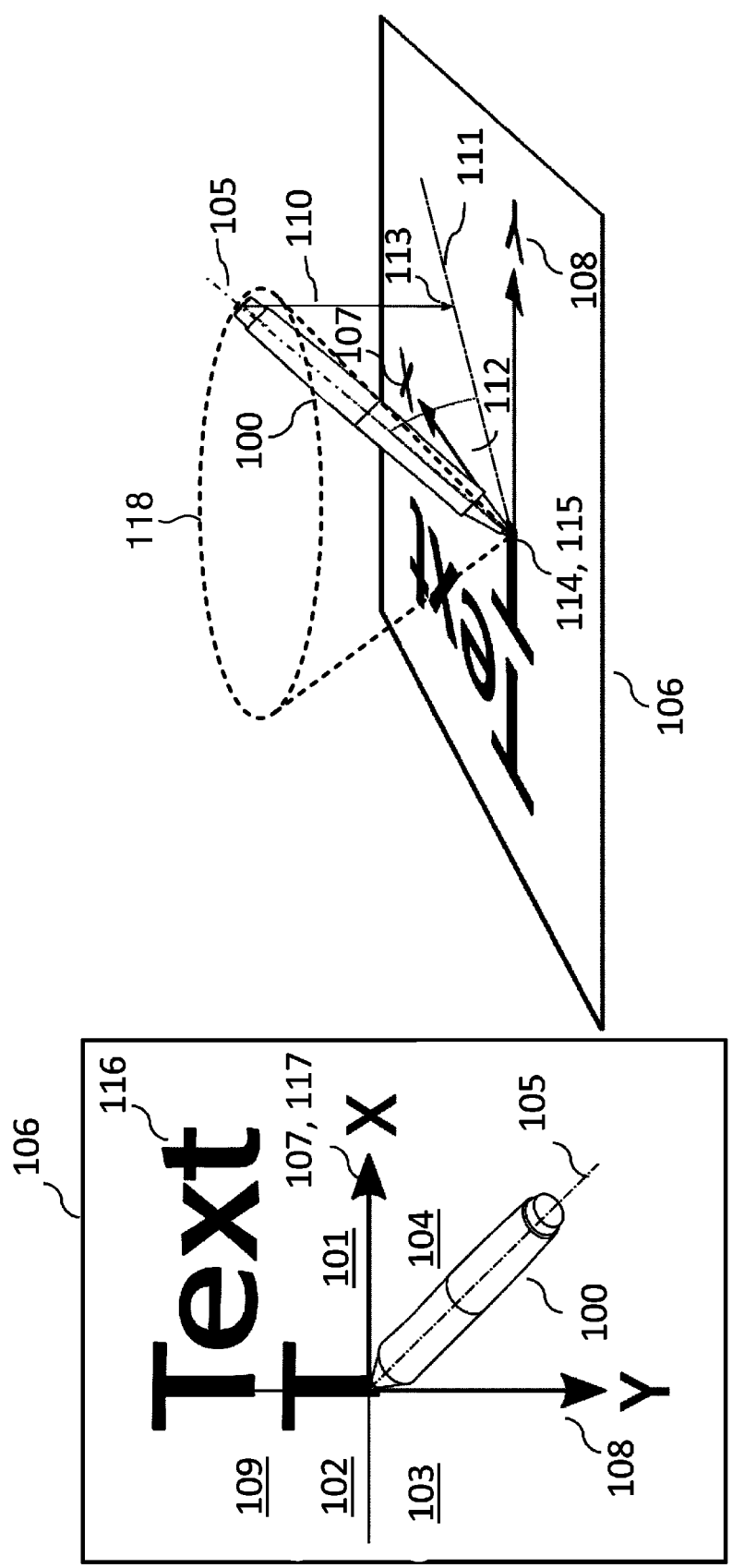

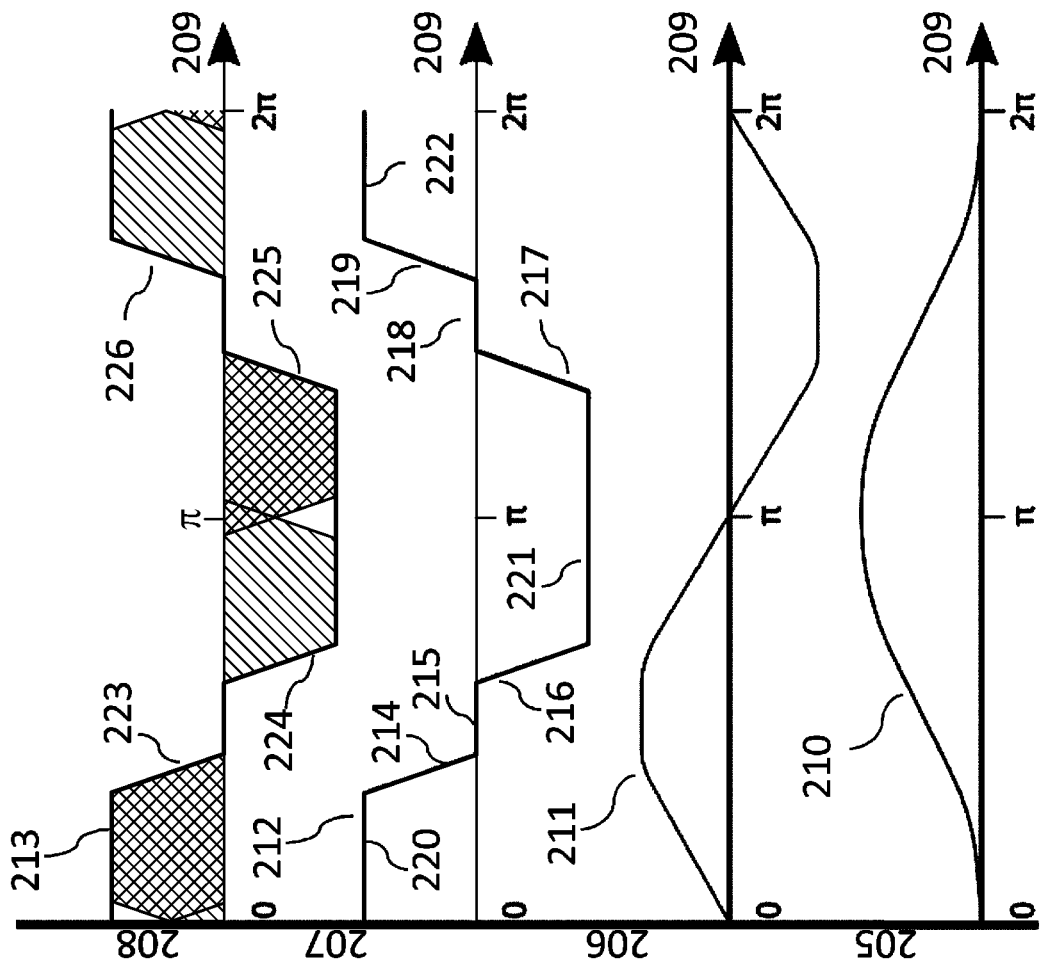
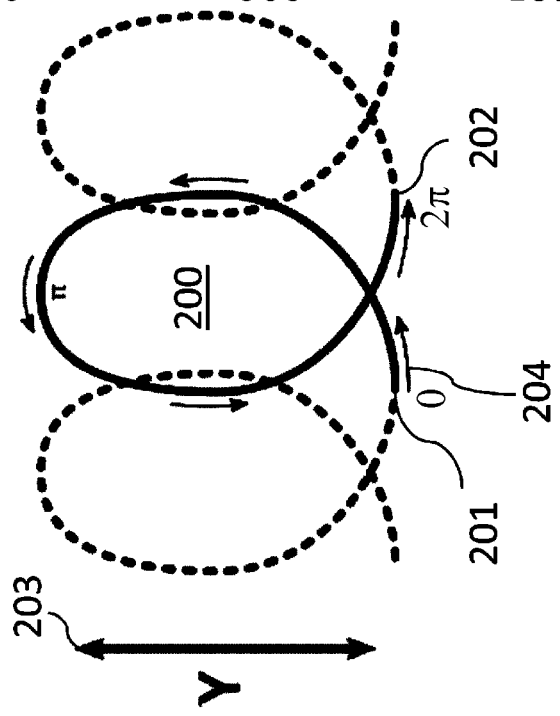
FIG. 2b
FIG. 2a

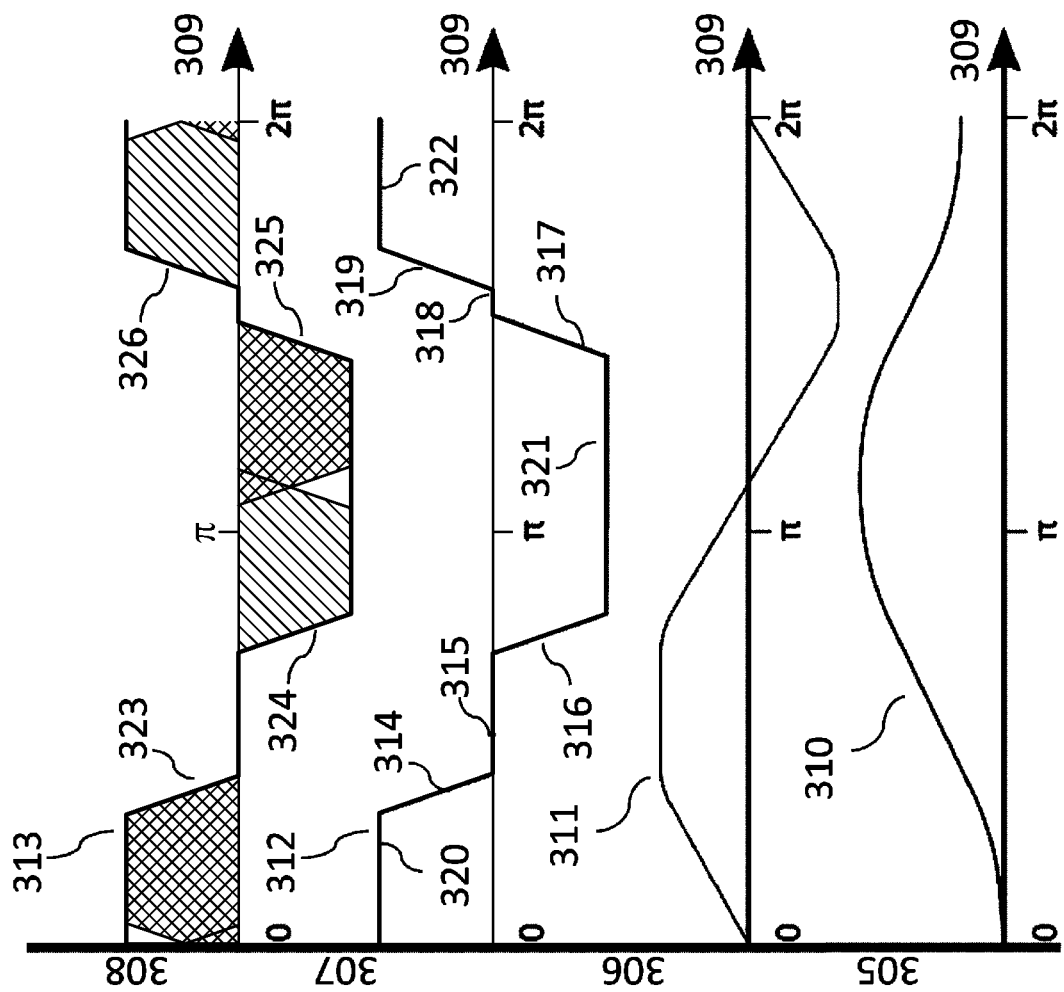
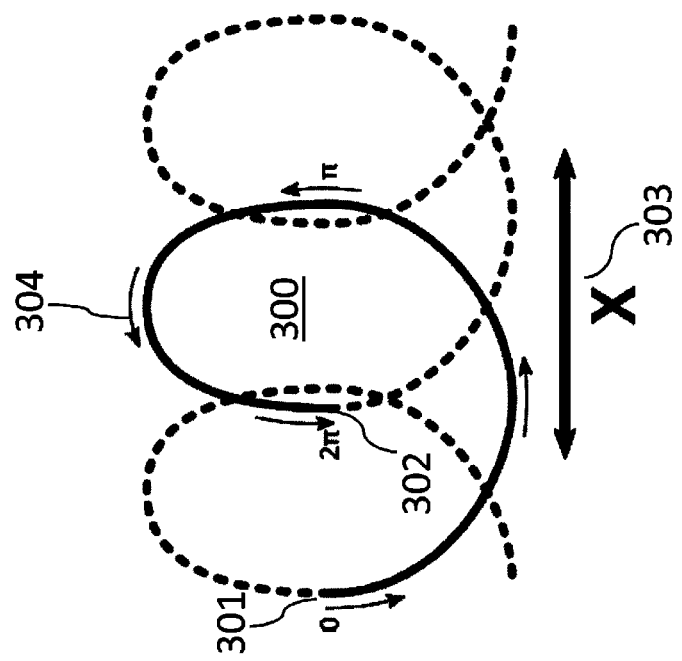
FIG. 3b
FIG. 3a

DETERMINATION OF WRITING DIRECTION BY MEANS OF INERTIAL SENSORS

STATE OF THE ART

The invention relates to an electronic pen of the type as specified in the preamble of patent claim 1 and a method as specified in the preamble of patent claim 9.

The ever-increasing use of electronic information and communication systems, especially of personal computers (PCs), laptops, tablets and smart phones in everyday life, leisure and work, makes it worthwhile to develop improvements of human-machine interfaces.

Besides human-machine interfaces such as keyboard, mouse or touch-sensitive surfaces, electronic pens are especially of interest. Electronic pens have inter alia the advantage that they can combine the functionality and simplicity of writing with a pen on a surface with the much more numerous possibilities of electronic data processing. Thereby it is desirable that the electronic pen is similar to a conventional pin as far as possible in appearance and handling.

In WO02/07424A2 for example, an electronic information system for handwriting recognition is described, which has a pen and a tablet with pressure- or induction-sensitive surface and in which the movements of the pen or the pen tip are captured either from the pressure or induction-sensitive surface of the tablet or by acceleration sensors or optical sensors.

The sensor data can then be transmitted wirelessly to a PC, which can, based on the received pen motion data, perform handwriting recognition.

However, a drawback of known electronic pens and electronic information systems for handwriting recognition is the need for an external position reference, such as a predetermined reference pattern on the writing substrate, which is evaluated via a camera in the electronic pen and used for position determination.

If one wants to make do without this external reference, currently, the motion and position data of the electronic pen, especially with respect to a writing substrate, cannot always be detected with sufficient accuracy, which may, for example, lead to an erroneous determination of the pen movement.

Problem

It is therefore the objective of the invention to improve an electronic pen, for example, with regard to accuracy, such that movements and positions of the electronic pen on a writing substrate can be determined, and in particular, for example, such that the writing direction of the electronic pen on a writing substrate can be determined even without the aid of an external reference.

Solution

According to the invention said objective is achieved by an electronic pen according to claim 1 and a method according to claim 9. Advantageous embodiments and further developments are the subject of the dependent claims.

It should first be noted that the term writing direction can be understood to mean, for example, a line connecting different consecutive writing patterns, e.g. characters, letters, words, and whereby the direction of the writing direction may refer to the chronological order in which the consecutive writing patterns were written with the electronic pen An exemplary electronic pen according to the invention can thereby comprise at least a writing lead, at least one electric voltage source, at least one digital processing unit, at least one data transfer module, and inertial position sensor technology or inertial sensors or an inertial position detection system for determining the location and movement or motion of the electronic pen.

The electronic pen can be configured for an initial specification of a writing coordinate system with two axes X, Y being orthogonal to each other on a two-dimensional writing substrate and with an axis Z being perpendicular to the two-dimensional writing substrate. In other words, the two axes X, Y that are orthogonal to each other are lying in the two-dimensional writing substrate.

The inertial position detection sensor system or inertial position sensors can further be configured for the determination of accelerations and acceleration profiles, in particular one-dimensional acceleration profiles, of the electronic pen along the X-axis and along the Y-axis for a plurality of pairs of different orientations of the X-axis and Y-axis on the writing substrate, wherein for each axis orientation pair or each pair of axis orientations, the axis orientation of the X-axis and the axis orientation of the Y-axis are orthogonal to each other The inertial position sensor technology or inertial position detection sensor system or inertial position sensors can further be configured for the determination of accelerations and acceleration profiles in the three-dimensional orthogonal coordinate system of the pen body, wherein the longitudinal axis of the electronic pen can specify or define an axis of pen body coordinate system.

The pen body coordinate system can thereby inter alia, for example, be transformed into a writing coordinate system as follows.

For example, by evaluating the acceleration information obtained by the inertial position detection sensor system in the pen body coordinate system, the direction of the Earth's gravitational field or the angle of the longitudinal axis of the electronic pen relative to the direction of gravity can be determined, and thereby an angle of inclination between the longitudinal axis of the electronic pen and a writing substrate/a write substrate plane can be determined.

Thereby, for example, for obtaining a first orientation of the two coordinate systems with respect to each other, the projection of the longitudinal axis of the electronic pen onto the writing substrate surface or plane or paper surface or plane can be regarded as angle bisector of a writing coordinate system, wherein, for example, the projection of the longitudinal axis can be obtained from the connection of two points: e.g. from the connection from the point of contact of the tip/pen tip of the electronic pen, for example, writing lead tip, and the foot of the perpendicular of the longitudinal axis of the electronic pen from or through the end of the casing of body of the electronic pen (or the foot of the perpendicular of the longitudinal axis of the electronic pen from or through any other point along the longitudinal axis that does not coincide with the pen tip) on the paper plane/writing substrate plane.

The origin of the writing coordinate system may then, for example, be specified by a/the first point of contact of the pen tip or writing tip and the axes X, Y of the writing coordinate system or writing substrate coordinate system may be, for example, be obtained from applying a rotation to the projected longitudinal axis of the pen, for example, a rotation by an exemplary angle of ±45°.

However, for example, the azimuth angle of the electronic pen or the azimuth angle of the longitudinal axis of the electronic pen in relation to the writing substrate/a writing substrate plane is initially unknown.

The exemplary described transformation of coordinates of an orthogonal pen coordinate system whose one axis coincides with the longitudinal axis of the pen into a possible orthogonal writing coordinate system on the writing substrate plane can thus be based on an inclination angle determined by the inertial position detection sensor system and a determined or assumed azimuth angle.

In other words, for example, the position of the electronic pen or the position of the longitudinal axis of the electronic pen relative to the writing substrate plane can be only located on a cone or cone surface whose tip is standing on the writing substrate and coincides with the pen tip or writing tip of the electronic pen.

The angular position or the azimuth angle of the longitudinal axis of the electronic pen on this cone, however, is initially unknown.

In theory, with an unknown azimuth angle, infinitely many pairs of different axial directions or orientations of X and Y axes in the two-dimensional writing substrate plane may be possible or be compatible with a possible position of the pen.

In other words, e.g. at a certain inclination angle of the pen, each pair of different axis directions or axis orientations of the X-axis and Y-axis of a writing coordinate system in the writing substrate plane or the writing coordinate system described by said pair, respectively, can be described by an azimuth angle.

From this multitude of pairs of different axis orientations of the X-axis and Y-axis, it is thus necessary to find the pair, or those axial directions or the azimuth angle, in which one axis of a pair, e.g. an X-axis, corresponds to the actual writing direction.

As mentioned, the inertial position detection sensor system may be configured to determine accelerations and acceleration profiles, particularly one-dimensional acceleration profiles, in orthogonal coordinate systems and accelerations or acceleration profiles in the pen coordinate system may be transformed to accelerations or acceleration profiles in a writing coordinate system on the writing substrate plane and vice versa.

Thus, the inertial position detection sensor system may be configured to determine accelerations and acceleration profiles, particularly one-dimensional acceleration profiles, of the electronic pen along an/the X-axis and along an/the Y-axis for a plurality of pairs of different X-axis and Y-axis orientations on the writing substrate, wherein for each pair of axis orientations, the axial orientation of the X-axis and the axis orientation of the Y-axis are orthogonal to each other.

The selection of the plurality of pairs of different axial orientations of the X-axis and Y-axis on the writing substrate for the accelerations and acceleration profiles, particularly one-dimensional acceleration profiles, of the electronic pen along an/the X-axis and along an/the Y-axis can be determined from the inertial position detection sensor system, for example, from a plurality of azimuth angles along a circumference of the above-described cone or cone surface, for example with a step size of 30° or 20° or 10°.

Thereby the selection of the plurality of pairs of different axial orientations of the X-axis and Y-axis on the writing substrate for the accelerations and acceleration profiles, particularly one-dimensional acceleration profiles, of the electronic pen along an/the X-axis and along an/the Y-axis can be determined from the inertial position detection sensor system, or the selection azimuth angles associable to the pairs, can be carried out by the digital processing unit of the electronic pen.

The plurality of pairs of different axial orientations of the X-axis (Y-axes) and Y-axis (Y-axes) on the writing substrate can for example be denoted by $\{X_o, Y_o\}_o$, $\{X_1, Y_1\}_1$, $\{X_2, Y_2\}_2$, $\{X_n, Y_n\}_n$, with n being a natural number greater than or equal to zero.

Unless explicitly stated otherwise the term X-axis and/or Y-axis can be understood as an axis from said exemplary pairs $\{X_o, Y_o\}_o$, $\{X_1, Y_1\}_1$, $\{X_2, Y_2\}_2$, $\{X_n, Y_n\}_n$, wherein in each pair the axes of the pair are orthogonal to each other.

Here, the various different orientations of the X-axis (Y-axes) and Y-axis (Y-axes) are chosen such, that all X-axes and Y-axes of the plurality of pairs are lying in two-dimensional writing substrate plane and such that the axes for each given pair are orthogonal to each other.

Said accelerations and acceleration profiles of the electronic pen that can be determined by the inertial position detection sensor technology may represent writing patterns of a writing operation the electronic pen, such as characters, letters or words. In particular, said accelerations and acceleration profiles may comprise sequences of periodic writing patterns.

One aspect of the present invention is based, inter alia, on the surprising finding that the evaluation of accelerations or acceleration profiles determined by the inertial position detection sensor system results in a more or less pronounced pattern in the temporal sequence of accelerations and decelerations, depending on how well the selected ones writing coordinate system axes, i.e. a given pair of each of an X-axis and a Y-axis or a corresponding azimuth angle assignable to the pair, coincide with the axes of that writing coordinate system in which the actual writing direction is parallel to an axis, e.g. the X-axis, or in which the actual writing direction coincides with an axis, e.g. the X-axis.

For the sake of completeness, it should be noted that for each pair of X-axis and Y-axis, a corresponding Z-axis orthogonal to the two axes can be determined to define an exemplary three-dimensional orthogonal writing coordinate system.

The term of the determination of accelerations may include the determination of absolute value and/or direction and/or sign of the acceleration and the term acceleration profile may include, for example, a one-dimensional acceleration profile for describing the temporal change of absolute value and/or direction and/or sign of the acceleration, or to describe the change over time of an/the acceleration signal measured by the inertial position detection sensor technology.

In particular, for example, the determination of said acceleration profile can, for example, be conducted along one of the axes of a given writing coordinate system or a given pen coordinate system.

Unless explicitly stated otherwise, an acceleration profile can be understood in particular to be a one-dimensional acceleration profile, in particular, for example, a one-dimensional acceleration profile along an axis of a writing coordinate system, i.e. for example, along an X-axis and/or Y-axis, which may lie within the writing substrate plane.

The said exemplary digital processing unit may be configured to determine the writing direction, said determination may be based on the determination of at least one characteristic property of an acceleration profile determined by the inertial position detection sensor system.

Among a characteristic property of an acceleration profile determined by the inertial position detection sensor system, one or a plurality of properties can be understood, e.g. mathematical and/or physical properties, or one or a plurality of conditions, e.g. mathematical and/or physical conditions.

In other words, said exemplary digital processing unit may be configured to determine at least one characteristic property of an acceleration profile determined by the inertial position detection sensor system, wherein the at least one characteristic property may depend, for example, on the selection of the plurality of pairs of different axis orientations of the X-axis and Y-axis on the writing substrate, which can each define a possible writing coordinate system, or may depend on the selection of the azimuth angle assignable to the pairs or the writing coordinate systems.

Herein, a possible refinement of the determination of the writing direction can, for example, be carried out by interpolating between two best solutions, or between two specific writing coordinate systems, and beyond, for further refinement, the determination of the writing direction for at least two more writing coordinate systems rotated with respect to the interpolated writing coordinate system, e.g. rotated by +10° and −10°, can be carried out.

An electronic pen according to the invention offers, inter alia, the advantage that the writing direction when a user is writing with the electronic pen on a writing substrate can be derived solely from the data or measurements of the accelerations of the electronic pen by the inertial position detection sensor system.

Thus, for example, it is possible to dispense with the use of external references, such as assumptions about the handedness and/or the writing language of the user, and/or assumptions on the orientation of the writing substrate.

In addition, an electronic pen according to the invention is based on the exploitation of the surprising finding that acceleration profiles of an electronic pen along the writing direction have characteristic properties, which can serve as a basis for determining the writing direction.

An electronic pen according to the invention may, for example, allow determining the writing direction with an accuracy of less than 10°, without having to resort to external references.

Incidentally, an electronic pen can be understood here as a rigid body, i.e. it can have three degrees of translational freedom and three rotational degrees of freedom, i.e. a total of six degrees of freedom of movement. In general, therefore, for example, two three-dimensional position detection sensors may be sufficient to describe the position and/or movement of the electronic pen in a three-dimensional coordinate system, apart from any potentially necessary initializations of the selected coordinate system and integration errors.

The term inertial position detection sensor system for detecting the position and movement of the electronic pen, unless explicitly stated otherwise, may include position-determining sensor systems or position-determining sensors which can measure accelerations in one spatial direction or in two or three mutually orthogonal spatial directions, and/or that can measure the strength of the local magnetic field and/or angular rates or rotation rates.

However, it is, for example, also conceivable that the electronic pen is only equipped with a three-dimensional, i.e. tri-axial, acceleration sensor for determining the writing direction. Since the writing direction determination described here e.g. can essentially be based on the evaluation of translational movements, said exemplary acceleration sensor can also be arranged at a distance from the longitudinal axis of the electronic pen.

The determination of said at least one characteristic property of an acceleration profile determined by the inertial position detection sensor system may, for example, comprise the determination of at least two time offsets or time intervals between at least two pairs of consecutive and opposite acceleration changes of acceleration profiles for a given orientation of the X-axis and a given orientation of the Y-axis from the plurality of pairs different axis orientations of the X-axis and Y-axis.

The term time offset may inter alia be understood to mean a time span, a period of time, a time interval or a time delay.

The term acceleration change may be understood as comprising, for example, a point in time at which the acceleration changes in absolute value or magnitude and/or in direction, and may also be understood as comprising time period over which the acceleration changes in absolute value or magnitude and/or direction.

For example, two consecutive opposite acceleration changes of the acceleration profiles for a given axial orientation of an X-axis and/or Y-axis can be understood as two consecutive opposite acceleration increases and/or acceleration maxima.

The term direction or opposite direction of the acceleration or acceleration change may be understood, among other things, as the sign of the acceleration, e.g. a positive or negative acceleration, e.g. a slowdown or deceleration.

Said two consecutive, opposite acceleration changes of the acceleration profiles for a given axial orientation of an X-axis and/or Y-axis can thereby form a pair, which can, for example, be referred to as an acceleration pair.

Said inertial position detection sensor system can thereby determine a plurality, for example, at least two, such acceleration pairs, for a given axial direction of an X-axis and/or Y-axis.

A/the digital processing unit of the electronic pen may be configured for determining the pair of orientation of X-axis and orientation of Y-axis for which the determined acceleration profile along one axis, e.g. the X-axis, has or fulfills the characteristic property, that the time offsets are external, e.g. are at a minimum (or minimal) and/or at a maximum (or maximal), and different from each other.

For example, this way two time offsets or periods between two consecutive opposite acceleration changes can be determined for an axis from two acceleration pairs of an acceleration profile along the axial orientation of the axis, e.g. the X-axis and/or Y-axis.

This determination may be made for a plurality of pairs of X-axis and Y-axis axis orientations, and the electronic pen, or the inertial position detection sensor system, or the digital processing unit may be configured such that the pair of axis directions (or axis orientations) of X-axis and Y-axis, e.g. $\{X_{best}, Y_{best}\}$, can be determined, wherein for an axis, e.g. the $X_{best}$-axis and/or the $Y_{best}$-axis, the determined time offsets or time spans between two consecutive opposite acceleration changes for at least two pairs of acceleration changes along an axis, e.g. the $X_{best}$-axis and/or the $Y_{best}$-axis, are external, e.g. are at a minimum (or minimal) and/or are at a maximum (or maximal), and are different from each other.

The electronic pen or the digital processing unit may thereby be configured to determine a/the time offset between a pair of consecutive opposite acceleration changes for a given axis orientation of the X-axis and a given axis orientation of the Y-axis, based on the first derivative of the determined accelerations and acceleration profiles, e.g. the determined one-dimensional acceleration profiles for a given axis orientation of the X-axis and a given axis orientation of the Y-axis.

This can, for example, offer the advantage that any zero-point errors of the inertial position detection sensor system can be eliminated and, for example, a better distinction can be made between a specific writing direction and a drift caused by errors in measurement signals of the inertial position detection sensor system with regard to the position and movement of the electronic pen determined from the measurement signals.

For example, the electronic pen or the digital processing unit may be configured determining the time offset or the time span between a pair of consecutive and opposite acceleration changes for a given orientation of the X-axis and a given orientation of the Y-axis from the time interval, for which the first derivative of the determined accelerations and the absolute value of the determined accelerations is equal to zero or almost equal to zero.

This allows unambiguous determination of the magnitude or amount of the time offset between a pair of consecutive opposite acceleration changes for a given axis orientation of the X-axis and a given axis orientation of the Y-axis.

Alternatively and/or additionally, it would be conceivable to determine a time offset or a time span between a pair of consecutive oppositely directed acceleration changes for a given axis orientation of the X-axis and a given axis orientation Y-axis from the time interval in/for which the first derivative the determined accelerations are equal to or near zero and the amount or absolute value of the determined accelerations is maximal or minimal, i.e. is at a maximum or at a minimum.

This way, for example, the time interval or the time offset or the time span between two extremes, maxima/maximum and/or minimum/minimum, of an acceleration profile can be determined. In the event that an acceleration profile has maximum plateaus or minimum plateaus instead of well-defined maxima or minima, it would, for example, also be conceivable to determine the time interval between the centers or center points of adjacent maximum plateaus and minimum plateaus.

Alternatively or additionally, it is also conceivable to use the maxima of the acceleration changes to determine those points in time which limit the time offset or the time span between a pair of consecutive oppositely directed acceleration changes.

Alternatively or additionally, moreover, it is, for example, conceivable to determine the writing direction based on carrying out the determination of the amplitudes of at least two consecutive and opposite acceleration changes of the acceleration profile for a given orientation of the X-axis and a given orientation of the Y-axis from the plurality of pairs of orientations of the X-axis and Y-axis.

For example, therefore, an electronic pen is conceivable, which may be configured alternatively or additionally, or whose digital processing unit may alternatively or additionally be configured to determine a writing direction, based on a determination of at least one characteristic property of the acceleration profile determined by the inertial position detection sensor system, wherein the determination of said characteristic property of the acceleration profile may comprise the determination of the amplitudes of at least two consecutive and opposite acceleration changes of the acceleration profile for a given orientation of the X-axis and a given orientation of the Y-axis from the plurality of pairs of orientations of the X-axis and Y-axis.

Thereby, electronic pen or the digital processing unit can be configured for determining the pair of orientation of the X-axis and orientation of the Y-axis for which the determined acceleration profile along one axis, e.g. the X-axis, has or fulfills the characteristic property, that the difference of the amplitudes of the at least two consecutive and opposite acceleration changes of the acceleration profile are external and different from zero.

In this way, the surprising technical insight and knowledge can be used that movements of the electronic pen in the writing direction can cause more intense accelerations as compared to correspondingly lower accelerations against the writing direction.

In other words, according to the invention, the writing direction may be determined from an asymmetry in the acceleration profile along the axial direction of an axis, e.g. the X-axis, for example, due to an asymmetry in the phase and/or amplitude of the acceleration profile.

The determination of the above-described time spans and time offsets together with the determination of the difference of amplitudes from at least two consecutive opposite acceleration changes can significantly increase the accuracy of the writing direction determination and improve the robustness of the writing direction determination.

Alternatively or additionally, moreover, it is, for example, conceivable, to determine the writing direction based on a comparison of an/the acceleration profile determined by the inertial position detection sensor system with a predetermined acceleration profile.

For example, an electronic writing pen is thus conceivable which may alternatively or additionally be configured, or whose digital processing unit may alternatively or additionally be configured to determine a writing direction based on determining at least characteristic property of an acceleration profile determined by the inertial position detection sensor system, and wherein the digital processing unit can be configured for carrying out a comparison of the acceleration profile determined by the inertial position detection sensor system with a predetermined acceleration profile for determining the pair of orientation of X-axis and orientation of Y-axis, for which the determined acceleration profile along one axis, e.g. the X-axis, has or fulfills the characteristic property, that the determined acceleration profile corresponds to the predetermined acceleration profile.

The term correspond can thereby be understood inter alia as a correspondence within a given tolerance.

If the writer generates, for example, a particular predetermined or known acceleration profile which relates or corresponds to an underlying particularly known writing pattern, for example a string of Us, it is, for example, possible to extract the writing direction or the writing substrate orientation from direction of acceleration following a point of rest or stop point at the tips of the Us. At the stops or stopping points, there is a momentary rest of the writing tip of the electronic pen, which, for example, can be detected by the noise of the acceleration sensor or the inertial position detection sensor system.

More specifically, for example, the power density spectrum of the noise of the acceleration sensor or the inertial position detector sensor system can be determined and thereby, for example, a threshold value can be set, below which it can be assumed that the tip is at a standstill.

For example, by evaluating the first derivative of the acceleration, the reversal point is to be found at a maximum of the derivative of the acceleration in one axis and a simultaneous minimum in the axis orthogonal thereto. This orthogonal axis is the writing direction in a string of Us (u letters). The use of the derivative of the acceleration has the advantage that it can be used to eliminate zero error of the sensor.

The determination of the above-described time intervals or time offsets together with the determination of the above described difference of amplitudes of at least two consecutive opposing acceleration changes, together with a comparison of an acceleration profile determined by the inertial position detection sensor system with a predetermined acceleration profile, can further improve the accuracy and robustness of the determination of the writing direction.

Said exemplary predetermined acceleration profile can, for example, be defined by a translational writing pattern, e.g. by a predetermined word and/or by a predetermined translational periodic pattern, e.g. a garland.

Further improvement of the accuracy and robustness of the writing direction determination can be achieved, inter alia, as follows.

As mentioned, the electronic pen may be configured to initially define or specify a writing coordinate system having two orthogonal axes X, Y on a two-dimensional writing substrate and an axis Z perpendicular to the two-dimensional writing substrate.

Thereby, said initial definition or specification of a writing coordinate system having two orthogonal axes X, Y on a two-dimensional write substrate and an axis Z may take into account at least one, some, or all of the following exemplary assumptions:
- the spatial position of the longitudinal axis of the electronic pen is not parallel to the direction of gravity,
- the surface of the writing substrate is oriented orthogonal to the direction of gravity,
- the user of the electronic pen is right-handed and/or left-handed,
- the writing direction is parallel to a border or an edge of the writing substrate, and the writing direction from the perspective of the user is from left to right or from right to left or from top to bottom.

Said exemplary assumptions can, inter alia, serve to determine the writing substrate position or write substrate orientation and ultimately the writing direction.

The exemplary assumption that the position of the longitudinal axis of the electronic pen is not parallel to the direction of gravity, i.e. the pen is held at an angle, should apply for the majority of cases, since it is usually difficult for the user to keep the electronic pen exactly vertical when writing.

In the case of holding the pen at an angle, for example, a projection of the longitudinal axis of the pen onto a plane, e.g. the writing substrate plane, can be formed that is perpendicular to the line of action of the gravity acceleration. Among other things, this projection, along with (said) other exemplary assumptions, may serve to determine an approximate paper position or writing substrate position.

For the exemplary assumption that the surface of the writing substrate is oriented orthogonal to the direction of gravity, that is the writing substrate is lying horizontal, exceptions are more easily possible. For example, this assumption may be invalid when placed on a clipboard, e.g. to hold the writing substrate, or written occurs in a moving vehicle. For the context of a graphomotoric measurement, however, a horizontal position of the writing pad or of the writing substrate can be assumed.

The assumption of the handedness of the user, for example, can be queried and/or optionally corrected after the acquisition of data from the inertial position sensor system.

However, the assumption of parallelism of the writing direction to an edge or border of the writing substrate should apply to most cases and may, for example, be coupled to a language setting of the software of the electronic pen.

While, for example, in western languages, the writing direction is from left to right, for example, in Arabic and Hebrew a direction of writing from right to left is to be assumed. For Asian writings, for example, it is also possible to write from the top to the bottom, which, however can be reversed by appropriate control of the writer by an appropriate software for graphomotoric measurement to the usual from left to right.

If one, some, or all of the exemplary assumptions apply, a good approximation of the sheet position of the writing substrate can inter alia be achieved even before the beginning of writing with the electronic pen, by, for example, interpreting the projection of the longitudinal axis of the electronic pen onto the paper plane or writing substrate plane as angle bisector of a paper sheet coordinate system or writing coordinate system in the writing substrate plane.

Thereby, for example, from the point of view of the user, the X-axis may point in the writing direction and the Y-axis may point down. The projection of the longitudinal axis can, for example, thereby be obtained from the connection of two points: the point of contact of the pen tip or writing lead tip and the foot of the perpendicular of the longitudinal axis of the electronic pen from or through the end of the casing of body of the electronic pen (or the foot of the perpendicular of the longitudinal axis of the electronic pen from or through any other point along the longitudinal axis that does not coincide with the pen tip) on the paper plane/writing substrate plane.

The origin of the writing coordinate system may then, for example, be specified by the first point of contact of the pen tip or writing lead tip and the axes X, Y of the writing coordinate system or writing substrate coordinate system may be, for example, be obtained from applying a rotation to the projected longitudinal axis of the pen, for example, a rotation by an exemplary angle of ±45°.

Said angle between the projection of the longitudinal axis of the pen in the writing substrate plane and the paper sheet coordinate system or writing coordinate system is an estimate and can be further refined by reference data, which, for example, can be collected by the inertial position detection sensor system.

For example, when setting up the electronic pen software driver or when initializing the electronic pen, the user can be ask to perform a left to right movement and another from top to bottom. Among other things, this makes it possible, for example, to more easily determine the inclination angle with which the pen is usually held, thus improving the determination of the projection of the longitudinal axis onto the writing substrate plane. If, for example, this angle is stored, a single measurement may be sufficient. In addition, later, a recalibration can be triggered in the same way by the user if he is no longer satisfied with the behavior of the electronic pen.

An exemplary method according to the invention for the determination of the writing direction of an electronic pen during writing on a two-dimensional writing substrate, whereby the electronic pen may comprise, for example, a writing lead, at least one electric voltage source, at least one digital processing unit, at least one data transfer module, and inertial position sensor technology or an inertial position detection sensor system for determining the location and movement of the electronic pen, may comprise one, some or all of the following steps:

e.g. an initial specification of a writing coordinate system with two axes X, Y being orthogonal to each other on a two-dimensional writing substrate and with an axis Z being perpendicular to the two-dimensional writing substrate, e.g. a determination of accelerations and acceleration profiles of the electronic pen along the X-axis and along the Y-axis for a plurality of pairs of different axis orientations of the X-axis and Y-axis on the writing substrate, whereby for each pair of axis orientations the axis orientation of the X-axis and the axis orientation of the Y-axis are orthogonal to each other, and a determination of the writing direction based on the determination of at least one characteristic property of a determined acceleration profile.

As mentioned above, such a method may, inter alia, offer the advantage that the writing direction when a user is writing with the electronic pen on a writing substrate can be derived solely from the data or measurements of the accelerations of the electronic pen by the inertial position detection sensor system.

Thus, for example, it is possible to dispense with the use of external references, such as assumptions about the handedness and/or the writing language of the user and/or assumptions about the orientation of the writing substrate.

In addition, a method according to the invention is based on the use of the surprising finding that acceleration profiles of an electronic pen along the writing direction have characteristic properties, which can serve as a basis for determining the writing direction.

Therein, for example, the determination of said at least one characteristic property of an acceleration profile determined by the inertial position sensor technology or the inertial position detection sensor system may comprise the determination of at least two time offsets or time spans between at least two pairs of consecutive and opposite acceleration changes of acceleration profiles for a given orientation of the X-axis and a given orientation of the Y-axis from the plurality of pairs different axis orientations of the X-axis and Y-axis.

In addition, the determination of the writing direction, based on the determination of the characteristic property of an determined acceleration profile may comprise a determination of the pair of orientation of X-axis and orientation of Y-axis for which the determined acceleration profile along one axis, e.g. the X-axis, has or fulfills the characteristic property, that the time offsets or time spans are external, e.g. minimal (at a minimum) and/or maximal (at a maximum), and different from each other.

Therein, a/the time offset or a/the time span between a pair of consecutive and opposite acceleration changes for a given orientation of the X-axis and a given orientation of the Y-axis can be determined based on the first derivative of the determined accelerations and acceleration profiles.

In particular, for example, a/the time offset or a/the time span between a pair of consecutive and opposite acceleration changes for a given orientation of the X-axis and a given orientation of the Y-axis can be determined from the time interval, for which the first derivative of the determined accelerations and the absolute value of the determined accelerations is equal to zero or almost equal to zero.

Alternatively or additionally, the determination of the writing direction can be based on carrying out comparison of the acceleration profile determined by the inertial position detection sensor system with a predetermined acceleration profile for determining the pair of orientation of X-axis and orientation of Y-axis, for which the determined acceleration profile along one axis, e.g. the X-axis, has or fulfills the characteristic property, that the determined acceleration profile corresponds to the predetermined acceleration profile.

For example, the predetermined acceleration profile may be defined by a predetermined translational writing pattern, e.g. by a predetermined word and/or by a predetermined translational periodic pattern, e.g. a garland. In other words, a translational writing pattern is not rotationally symmetric. In contrast thereto, stationary writing patterns can be rotationally symmetric.

In general, the acceleration profiles determined according to the invention by the inertial position detection sensor system of the electronic pen can represent writing patterns that are based on writing operations performed by the user with the electronic pen.

The term periodic writing pattern can be understood to mean repetitive writing patterns.

Periodic writing patterns can offer the advantage that an improved determination of the writing direction can result from the periodic acceleration profiles measurable therefrom, since e.g. the writing directions determined from a plurality of periodic acceleration profiles can be determined better and more accurately.

The longer a writing operation takes or the more periodic writing patterns are written, the easier and more accurate a (dominant) writing direction can be determined. For example, it would be conceivable that the user may be asked to first generate a garland over the entire width of the writing substrate.

The following figures show exemplarily:

FIG. 1a: Exemplary first view (top view) of a writing coordinate system

FIG. 1b: Exemplary second view (side view) of a writing coordinate system

FIG. 2a: Exemplary stationary periodic writing movement

FIG. 2b: Exemplary properties of a stationary periodic writing movement

FIG. 3a: Exemplary translational periodic writing movement

FIG. 3b: Exemplary properties of a translational periodic writing movement

FIG. 4: Exemplary properties of a writing movement with phase shift and amplitude difference The figures FIG. 1a and FIG. 1b illustrate, by way of example, various perspective views of a possible location of the exemplary electronic pen 100 with respect to an exemplary write substrate 106, e.g. a sheet of paper.

In addition, the figures depict an exemplary initially specified writing coordinate system or an exemplary writing coordinate system determined by an inertial position detection sensor system having two orthogonal axes X, Y (with reference numerals 107, 108) on the two-dimensional writing substrate 106.

The axes X (107), Y (108) represent an exemplary pair {X, Y} (109) of X-axis and Y-axis whose axes are orthogonal to each other. For example, said axes 107, 108 may divide the writing coordinate system into four quadrants on the writing substrate 106, namely, a first quadrant 101, a second quadrant 102, a third quadrant 103, and a fourth quadrant 104.

The use of quadrants may simplify the processing and description assumptions about the user's handedness, as well as, for example, simplify an (initial) definition or specification of the writing coordinate system.

In the exemplary illustration in FIG. 1a and FIG. 1b, the exemplary longitudinal axis 105 of the electronic pen 100 is not aligned parallel to the direction of gravity (not shown). Further, for example, the surface of the writing substrate 106 is oriented orthogonal to the direction of gravity. In other words, the electronic pen 100 may have an exemplary angle of inclination 112 between the longitudinal axis 105 of the electronic pen 100 and the writing substrate/writing substrate plane 106.

For the sake of clarity, an example of the already mentioned cone or conical surface 118 is shown in FIG. 1b, which can represent the potential possible locations of the pen 100 for an exemplary given angle of inclination 112, wherein the tip of the cone/conical surface stands on the writing substrate 106 and can coincide with the writing tip 114 of the electronic pen 100.

The writing direction 117, exemplified by the exemplary writing pattern 116, is illustratively parallel to an edge or border of the writing substrate, and the writing direction 117 from the perspective of the user is, for example, from left to right.

Thus, for example, the projection 111 of the longitudinal axis 105 of the electronic pen 100 on the writing substrate plane 106 or paper plane can be regarded as an angle bisector of a writing coordinate system.

In this case, for example, the X-axis 107 points in the writing direction 117 and the Y-axis 108 as seen from the user points downwards. The projection 111 of the longitudinal axis may be obtained, for example, from the connection of two points:

e.g. from the connection from the point of contact 115 of the tip/pen tip 114 of the electronic pen, for example, writing lead tip, and the foot 113 of the perpendicular of the longitudinal axis 105 of the electronic pen 100 from or through the end of the casing of body of the electronic pen 100 (or the foot of the perpendicular of the longitudinal axis 105 from or through any other point along the longitudinal axis 105 that does not coincide with the pen tip) on the paper plane/writing substrate plane 106.

The origin of the writing coordinate system may then, for example, be specified by a/the first point of contact 115 of the writing tip 114 and the axes X, Y of the writing coordinate system or writing substrate coordinate system may be, for example, be obtained from applying a rotation to the projected longitudinal axis 111 of the pen, for example, a rotation by an exemplary angle of ±45°.

Said exemplary angle between the projection 111 of the pen longitudinal axis 105 and the writing coordinate system is an estimate, which can be refined with better reference data.

For example, when setting up the electronic pen software driver or when initializing the electronic pen, the user can be ask to perform a left to right movement and another from top to bottom. This can make it possible, for example, to more easily determine the inclination angle with which the pen is usually held. If, for example, this angle is stored, a single measurement may suffice. Additionally, a recalibration can be triggered later in the same way by the user if he should no longer be satisfied with the behavior of the electronic pen.

While, for example, as shown, for a right-handed person a rather standardized position of the electronic pen (as seen from the point of view of the user) can be assumed to be in the lower right quadrant, i.e. in the fourth quadrant 104, for left-handed persons positions in all other quadrants are possible.

In order to decide which pen position is actually taken, it is helpful to evaluate both the position of the projection 111 of the pen longitudinal axis and the properties of an acceleration profile determined by the inertial position detection sensor system for detecting the position and movement of the electronic pen.

For completeness, it should be mentioned that a possible third spatial axis of the writing coordinate system, e.g. a Z-axis, which is for example perpendicular to the two-dimensional writing substrate 106 or orthogonal to the axes X, Y, is not shown for reasons of clarity.

FIG. 2a shows schematically an exemplary writing process or writing operation with an exemplary stationary periodic (loop-shaped or l-shaped) writing pattern 200 or a writing pattern element (solid loop-shaped or l-shaped line), wherein the starting point 201 and the end point 202 of the writing operation or of the writing pattern or of the writing pattern element is exemplary marked.

The writing pattern 200 is exemplarily oriented such that the starting point 201 and the end point 202 of the writing operation or the writing pattern or the writing pattern element, have the same coordinates with respect to the exemplary shown Y-axis 203. In the exemplary stationary periodic writing pattern, moreover, the exemplary direction of the writing movement is identified by the reference numeral 204.

FIG. 2b exemplarily and idealized illustrates, among other things, the course of the path or position 210, speed or velocity 211 and acceleration 212 of the electronic pen as a function of time 209 for the exemplary stationary periodic writing pattern 200. In other words, for example, the acceleration profile 212 can be understood as an acceleration profile for accelerations normal or orthogonal to the writing direction when writing loops.

The reference numeral 205 exemplary denotes a Y-axis component/the Y-axis component of an exemplary position or location signal or position signal profile of the exemplary writing operation 200 of FIG. 2a of an electronic pen.

Reference numeral 206 denotes, for example, the speed or velocity of the writing operation 200, and the reference numeral 207 indicates the acceleration of the writing operation 200 (determined by the inertial position detection sensor system of the electronic pen).

In addition, an idealized muscle activation potential is exemplary shown and that is intended to describe the driving (agonist) and inhibitory (antagonist) roles of muscle pairs that can be activated when writing the writing pattern 200. Reference numeral 213 exemplary denotes the enveloping curve of an exemplary force profile or effort profile based on the writing operation 200.

Reference numerals 223, 224, 225, 226 denote exemplary force changes for agonist 223, 225 and antagonist 224, 226.

When writing with the electronic pen, for example, a series of loops (as in the case of the handwriting letter l) from left to right, the pen tip performs a regular reciprocating motion, the simplest element of which may be the exemplary writing pattern 200.

Since the writing of the writing pattern 200 may be a repetitive motion, the time axis 209 may also be understood as the angle of a polar coordinate system.

Thus, FIG. 2b (as well as FIG. 3 and FIG. 4) can be understood as a description of the time sequence within a phase of a cyclic or periodic movement.

In this case, the agonistic muscle movement can first provide for an acceleration of the pen in the selected direction, whereby a speed or velocity can build up and the pen tip can begin to move in this direction.

Without inhibitory force, this movement may continue until an antagonistic muscle movement can exert a force acting against the initial acceleration on the pen.

In the example 213 shown, the strength and duration of the action of force for the agonist and antagonist are the same, as a result of which the speed or velocity can be completely reduced and the pen tip can briefly come to rest. Thereafter, the roles of the muscles can reverse and there can be a seamless countermovement, which can again assume an action of force that is identical in strength and duration.

This will allow the pen tip to return to its starting point at the end of this cycle/period and will allow the speed or velocity to be completely reduced again.

The exemplary illustrated course or sequence can be found in particular when writing loops that are oriented or aligned parallel to/or in the Y-axis.

In this exemplary case of the writing pattern 200, the profiles for location or position 210, speed or velocity 211, and acceleration 212 of the electronic pen as a function of time 209 are symmetrical with respect to half the period of the writing operation 200.

From the point of view of the acceleration profile 212, the time offsets or time spans 215, 218 have the same size or the same length. Therein, the time offsets or time spans 215, 218 are exemplary determined by the time interval between a pair of consecutive opposite acceleration changes.

For example, the time offset/time span 215 is determined by the time interval between the acceleration change 214 in the positive axis direction and the acceleration change 216 in the negative axis direction, and the time offset/time span 218 is determined by the time interval between the acceleration change 217 in the negative axis direction and the acceleration change 219 in the positive axis direction. Thus, the acceleration changes 214 and 216, as well as 217 and 219 may each be construed as a pair of consecutive opposite acceleration changes.

In addition, it should be noted that the acceleration extrema or acceleration maxima from 220, 221, 222 have, for example, the same amplitude.

The time offsets or time spans 215, 218 can be determined inter alia by the fact that there the first derivative of the determined accelerations and the (absolute) value of the determined accelerations are equal to or nearly equal to zero.

If one observes the course of the profiles 210, 211, 212, 213 in the Y direction, compared to the course of profiles for position or location 310, speed or velocity 311 and acceleration 312 of the electronic pen as a function of the time 309 in the X direction, the temporal sequence of muscle movements is changed.

For better understanding, the periodic translational (loop-shaped or l-shaped) writing pattern or the writing process 300 or writing pattern element (continuous loop-shaped or l-shaped line) is shown by way of example in FIG. 3a, wherein the starting point 301 and the end point 302 of the writing operation or the writing pattern or the writing pattern element are exemplary marked.

The writing pattern 300 is exemplarily aligned such s that the writing direction is aligned parallel to the X-axis 303. In this case, for example, the starting point 301 and the end point 302 of the writing operation or the writing pattern or the writing pattern element are at the same height (or the same Y-axis coordinate), however, the coordinates of starting point 301 and end point 302 differ with respect to the exemplary illustrated X-axis 303.

For example, the writing patterns 300 and 200 differ only in the start and end points of the write operations, but may have the same writing movements or may represent the same writing movements In the exemplary translational periodic writing pattern, moreover, the exemplary direction of the writing movement is designated by the reference numeral 304.

FIG. 3b exemplarily shows the course of the profiles of the position or location 310, speed or velocity 311 and acceleration 312 of the electronic pen as a function of time 309 in the X-direction for the exemplary translational periodic writing pattern 300.

In contrast to FIG. 2b, the acceleration profile 312 can be understood as an acceleration profile for accelerations in the writing direction when writing loops.

The reference numeral 305 designates by way of example an X-axis component/the X-axis component of an exemplary position signal or location signal or position signal profile of the exemplary writing operation 300 of an electronic pen from FIG. 3a.

Reference numeral 306 denotes, for example, the speed or velocity of writing operation 300, and reference numeral 307 denotes the acceleration of writing operation 300 (determined by the inertial position detection sensor system of the electronic pen).

In addition, an idealized muscle activation potential is exemplary shown and that is intended to describe the driving (agonist) and inhibitory (antagonist) roles of muscle pairs that can be activated when writing the writing pattern 300. Reference numeral 213 exemplary denotes the enveloping curve of an exemplary force profile or effort profile based on the writing operation 300.

Reference numerals 323, 324, 325, 326 denote exemplary force changes for agonist 323, 325 and antagonist 324, 326.

In contrast to the exemplary case from FIG. 2b, the temporal distribution of the muscle movements is now changed: for example, the first antagonist 324 is acting now delayed and the second antagonist 326 acts earlier relative to the respective agonist 323, 325.

Now, while the strength and duration of the acting forces of the muscles are still the same, the temporal shift may cause the speed or velocity in the forward direction to be longer than in the backward direction, resulting in a permanent shift in the Y-direction of the pen tip after passing the full cycle/full period.

This exemplary phase shift of antagonist-agonist force action is to be found, and, for example, when its value averaged over a certain period of time in a certain direction is at its maximum, the writing direction is found.

In particular, the determination of the writing direction may be based on the determination of at least one characteristic property of the acceleration profile 312, which reflects said exemplary phase shift of the antagonist-agonist force action/force effect.

For example, if the (absolute) value of the derivative of the acceleration exceeds a threshold, it may identify the onset of force and avoid the effects of zero point errors.

A simple evaluation of the velocity is not sufficient to determine the writing direction, because in the velocity profile it is indistinguishable from simple drift or position detection sensor system signal drift (for example, caused by external or internal disturbances).

As described above, therefore, for a plurality of rectangular coordinate systems, or for a plurality of pairs of different axis orientations of the X-axis and Y-axis on the writing substrate in a previously initially specified paper sheet plane or writing substrate plane (e.g. by defining that the Z-direction is aligned with gravity and that the X-Y-plane, i.e. the writing substrate plane, is arranged perpendicular thereto) the time offset/the time span between two consecutive, opposing acceleration increases or acceleration maxima can be determined.

If, for example, the first acceleration takes place in the positive axis direction, this time offset must be at a maximum when the positive axis direction becomes equal to the writing direction. If, for example, however, the first acceleration occurs in the negative axis direction, the distance in time to the next, opposite acceleration increase or the maximum acceleration must be at a minimum.

In order to be able to ensure, for example, sufficient certainty of this solution, this determination can be carried out several times and the average of the individual axis directions or orientations recognized as writing directions can be selected.

For axis directions or axis orientations that are normal, i.e. orthogonal, to the writing direction, the times between the acceleration pairs should not differ on average, regardless of their sense of direction.

Therefore, if, for example, a vectorial addition of multiple time offsets results in a non-zero value that reaches a maximum for an axial direction, this can serve as an indication for the identification of the writing direction.

As mentioned, in particular, the derivation of the acceleration can be used to determine the time offsets in the acceleration profile.

To determine the points in time that can be used for the time measurement of the time offset several possibilities are conceivable.

One possibility is, for example, to use the maximum of an acceleration change for the choice of the point in time/points in time.

Since the onset and termination of an acceleration makes the change in writing speed or writing velocity reach a maximum, alternatively, with the aid of the zero points of the first derivative of the acceleration, the respective end and start times for a time offset or the time span between a pair of consecutive oppositely directed acceleration changes can be determined.

In the exemplary shown acceleration profile 312, the reference numeral 314 denotes an exemplary acceleration change in the positive axial direction, which, after a first time offset 315, is followed by an opposite acceleration change 316 in the negative axial direction. The acceleration changes 314, 316 thus represent an exemplary (first) pair of successive opposite acceleration changes.

Another (second) pair of consecutive opposite acceleration changes, for example, is given by the acceleration change 317 in the negative axial direction and the acceleration change 319 in the positive axial direction, wherein the time offset between this exemplary second pair is denoted by the reference numeral 318. The two time offsets 315, 318 are not symmetrical, e.g. of different size or duration. In the present exemplary case, the first time offset 315 is at a maximum and the second time offset 318 is a minimum, i.e. the (absolute) value of the difference of the time offset 315, 317 is at a maximum, since the exemplary writing direction of the writing pattern 300 is parallel to the X-axis.

As mentioned above, the derivation of the acceleration profile 312 can be used to determine the time offsets 315, 318. For example, the time offsets 315, 318 may be determined from the time interval for which the first derivative of the determined accelerations and the (absolute) value of the determined accelerations are equal to or near zero For completeness, it should be noted that the acceleration extrema or acceleration maxima acceleration maxima plateaus 320, 321, 322 have, for example, the same amplitude.

In addition, it should be noted that the acceleration changes 314, 316, 317, 319 that may serve to determine the time offsets 315, 318 may be described, for example, by the derivative of the acceleration being nonzero, and the (absolute) value of acceleration at a point in time of the/an acceleration change being equal to zero. This also applies analogously to the acceleration changes 214, 216, 217, 219 from FIG. 2b.

For the sake of completeness, it should also be mentioned that since the writing of loops is a periodic process, the time axes in both figures are plotted as phase angles over an entire period from 0 to 2π. FIGS. 2a and 3a show a possible writing trace that can be generated by the acceleration profiles shown in FIGS. 2b and 3b. Therein, the solid line part of the curves stands for a whole period, while the dashed part indicates the curve behavior before and after this period. It should be noted that the plot in Y (FIG. 2a) is shifted by π/2 from that in the X-direction (FIG. 3a), so that the similarity of the acceleration profile characteristics can be better emphasized. It can easily be seen that there is a phase shift in the direction of writing during the deceleration of the starting movement and at the beginning of the countermovement, which does not occur in the direction normal to the writing direction. While the solid line in FIG. 2a ends at the same y-coordinate as it begins, there is an offset in the X-direction in FIG. 3a after passing through a period.

FIG. 4 exemplary shows a profile of position 405, velocity 406, and acceleration 407 of the electronic pen in X-direction as a function time 404 for an exemplary more general writing pattern (not shown) in which the amplitudes of the acceleration extrema are different in the writing direction.

The reference numeral 400 denotes an X-axis component/the X-axis component of an exemplary location or position signal or position signal profile of an exemplary (not shown) writing operation of an electronic writing pen.

Reference numeral 401 denotes, for example, the velocity or speed of the writing operation, and reference numeral 402 denotes the acceleration of the (not shown) writing operation (determined by the inertial position detection sensor system of the electronic pen).

In addition, an idealized muscle activation potential is shown by way of example which is intended to describe the driving (agonist) and inhibiting (antagonist) role of muscle pairs, which can be activated when writing the writing pattern. Reference numeral 418 exemplary shows the enveloping curve of an exemplary force profile based on the writing operation.

In the preceding examples, it has been assumed by way of example that the acceleration amplitudes are the same in both axial directions. Alternatively, in a translational writing pattern it is however also possible that a more intense (higher or stronger) acceleration in the writing direction and a correspondingly lower (weaker) acceleration in the opposite direction can occur.

While normal or orthogonal to the writing direction, both the driving and the inhibiting acceleration may have the same amplitude, a higher amplitude is required along the writing direction for movements in the writing direction and a lower one for movements against the writing direction for cases in which translation without phase shift is to be achieved. FIG. 4 shows this by way of example.

The difference of the amplitudes of at least two consecutive oppositely directed acceleration changes can thus serve as an alternative or in addition to the determination of the writing direction.

In particular, for example, the determination of the writing direction may be based on determining an acceleration profile along the axial direction of an axis, e.g. the X-axis, satisfying the at least one characteristic that the difference in the amplitudes of (the) at least two consecutive opposite acceleration changes of the acceleration profile(s) is external and distinct from zero.

In reality, a combination of both effects (asymmetry of the temporal distribution of the muscle movements and asymmetry of the amplitudes) will usually be encountered, so that both a phase shift and an amplitude difference may be measurable and may serve to determine the writing direction.

However, for an accurate determination of the amplitude, a higher quality of the sensor data of the inertial position detection sensor system may be required because, for example, noise and a limited temporal resolution can stand in the way of an exact determination of the amplitude. To improve the accuracy of the amplitude measurement, it would be, inter alia, for example, conceivable to increase the number of amplitude measurement and to use different statistical evaluation methods.

In all exemplary illustrated profiles for position 405, velocity 406, and acceleration 407 of the electronic pen in the X-direction as a function of time 404 for an exemplary writing pattern (not shown), the various amplitudes can be recognized.

In the acceleration profile 407, for example, after an acceleration maximum (in the positive axial direction) with a first amplitude 414, a first acceleration change in the positive axial direction 408 occurs, which after a first time offset transitions into a second acceleration change 410, which reaches second acceleration maximum (in the negative axis direction) with a second acceleration change amplitude 415.

This is followed by another (third) acceleration change in the negative axial direction or an acceleration change section 427 whose derivative is not equal to zero and for which in each point of the section the acceleration is not equal to zero. Therein, the acceleration profile reaches a further (third) acceleration maximum (in the negative axial direction) with a third amplitude 416.

This is followed by another (fourth) acceleration change 411 in the negative axial direction, which after a (second) time offset 412, in which the derivative of the acceleration and the (absolute value) of the acceleration is zero, transitions into another (fifth) acceleration change 413 in the positive axial direction and reaches a further (fourth) acceleration maximum 417 (in positive axial direction).

The different magnitudes or sizes and the evolution of the amplitudes 414, 415, 416, 417 of the acceleration profile are also found in the amplitudes 423, 424, 425, 426 and force changes or muscle activation potential changes 419, 420, 428, 421, 422 of the driving muscles of the force profile 418.

This is followed by 4 sheets with the figures FIG. 1a, 1b, 2a, 2b, 3a, 3b and 4. The reference numerals therein are assigned as follows.

100 Exemplary electronic pen
101 Exemplary (first) quadrant of a writing coordinate system
102 Exemplary (second) quadrant of a writing coordinate system
103 Exemplary (third) quadrant a writing coordinate system
104 Exemplary (fourth) quadrant of a writing coordinate system
105 Exemplary longitudinal axis of exemplary electronic pen
106 Exemplary writing substrate, exemplary writing substrate plane
107 Exemplary X-axis
108 Exemplary Y-axis
109 Exemplary pair {X, Y} of X-axis and Y-axis, wherein the axes are orthogonal to each other
110 Exemplary perpendicular from the longitudinal axis of the electronic pen onto the writing substrate
111 Exemplary projection of the longitudinal axis of the electronic pen onto the writing substrate/writing substrate plane
112 Exemplary inclination angle between the longitudinal axis of the electronic pen and the writing substrate/writing substrate plane
113 Exemplary foot/foot point of perpendicular
114 Exemplary tip/writing tip/pen tip of electronic pen/exemplary writing lead tip
115 Exemplary point of contact/contact point of tip of the electronic pen, exemplary origin of exemplary writing coordinate system
116 Exemplary written writing pattern, exemplary written text
117 Exemplary writing direction
118 Exemplary cone or cone surface, set of possible locations or positions of electronic pen for a given inclination angle or elevation angle
200 Exemplary periodic stationary pattern/writing pattern/writing pattern element in exemplary Y-axis direction/orientation, exemplary writing operation
201 Exemplary starting point of an exemplary writing movement, exemplary begin/end of stationary periodic pattern
202 Exemplary end point of exemplary writing movement, exemplary end, exemplary end point of stationary periodic pattern
203 Exemplary Y-axis
204 Exemplary writing operation, exemplary writing movement, exemplary writing process, exemplary direction of writing movement
205 Exemplary ordinate, e.g. Y-axis component of the location/position of the electronic pen as a function of time or phase
206 Exemplary ordinate, speed or velocity of a/the writing operation/writing movement
207 Exemplary ordinate, acceleration of a/the writing operation/writing movement
208 Exemplary ordinate, force/force effort of a/the writing operation/writing movement
209 Exemplary abscissa, e.g. time axis or phase angle over a period of 0 to $2\pi$ of a/the writing operation of an electronic pen
210 Exemplary Y-axis component/Y-axis component of an exemplary location signal or positional signal of an/the exemplary electronic pen writing operation, exemplary position signal profile of an exemplary electronic pen writing operation
211 Exemplary Y-axis component/Y-axis component of an exemplary velocity signal of an/the exemplary electronic pen writing operation, exemplary velocity profile of an exemplary electronic pen writing operation
212 Exemplary Y-axis component/Y-axis component of an exemplary acceleration signal of an/the exemplary electronic pen writing operation, exemplary acceleration profile of an exemplary electronic pen writing operation
213 Exemplary force profile or force effort profile, exemplary muscle activation potential of the hand or finger or arm muscles of a user when performing a/the exemplary writing operation with an electronic pen
214 Exemplary acceleration change, exemplary acceleration drop/acceleration increase in positive axis direction/positive axial direction
215 Exemplary (first) time offset/exemplary time span between a (first) pair of consecutive opposite acceleration changes
216 Exemplary acceleration change, exemplary acceleration drop/acceleration increase in negative axis direction/negative axial direction
217 Exemplary acceleration change, exemplary acceleration drop/acceleration increase in negative axis direction/negative axial direction
218 Exemplary (second) time offset/exemplary time span between a (second) pair of consecutive opposite acceleration changes
219 Exemplary acceleration change, exemplary acceleration drop/acceleration increase in positive axis direction/positive axial direction
220 Exemplary (first) acceleration maximum (in positive axis direction) or (first) acceleration maximum plateau (in positive axis direction)
221 Exemplary (second) acceleration maximum (in negative axis direction) or (second) acceleration maximum plateau (in negative axis direction)
222 Exemplary (third) acceleration maximum (in positive axis direction) or (third) acceleration maximum plateau (in positive axis direction)
223 Exemplary (first) force change or force effort change, muscle activation potential change of the driving muscle (agonist)
224 Exemplary (second) force change or force effort change, muscle activation potential change of the inhibitory muscle (antagonist)
225 Exemplary (third) force change or force effort change, muscle activation potential change of the driving muscle (agonist)
226 Exemplary (fourth) force change or force effort change, muscle activation potential change of the inhibitory muscle (antagonist)
300 Exemplary periodic translational pattern/writing pattern/writing pattern element in exemplary X-axis direction, exemplary writing operation
301 Exemplary starting point of an exemplary writing movement, exemplary beginning/start of the translational periodic pattern
302 Exemplary end point of an exemplary write movement, exemplary end, exemplary end point of the translational periodic pattern
303 Exemplary X-axis
304 Exemplary writing operation/writing process, exemplary writing movement, exemplary direction of writing movement/writing direction
305 Exemplary ordinate, exemplary X-axis component of the location/position of the electronic pen as a function of time or phase
306 Exemplary ordinate, velocity of a/the writing operation
307 Exemplary ordinate, acceleration of a/the writing operation
308 Exemplary ordinate, force or force effort of a/the writing operation
309 Exemplary abscissa, e.g. time axis or phase angle over a period of 0 to $2\pi$ of a/the writing operation of an electronic pen
310 Exemplary X-axis component/X-axis component of an exemplary location signal or positional signal of an/the exemplary electronic pen writing operation, exemplary position signal profile of an exemplary electronic pen writing operation
311 Exemplary X-axis component/X-axis component of an exemplary velocity signal of an/the exemplary electronic pen writing operation, exemplary velocity profile of an exemplary electronic pen writing operation
312 Exemplary X-axis component/X-axis component of an exemplary acceleration signal of an/the exemplary electronic pen writing operation, exemplary acceleration profile of an exemplary electronic pen writing operation
313 Exemplary force profile or force effort profile, exemplary muscle activation potential of the hand or finger or arm muscles of a user when performing a/the exemplary writing operation with an electronic pen
314 Exemplary acceleration change, exemplary acceleration drop/acceleration increase in positive axis direction/positive axial direction
315 Exemplary (first) time offset/exemplary time span between a (first) pair of consecutive opposite acceleration changes
316 Exemplary acceleration change, exemplary acceleration drop/acceleration increase in negative axis direction/negative axial direction
317 Exemplary acceleration change, exemplary acceleration drop/acceleration increase in negative axis direction/negative axial direction
318 Exemplary (second) time offset/exemplary time span between a (second) pair of consecutive opposite acceleration changes
319 Exemplary acceleration change, exemplary acceleration drop/acceleration increase in positive axis direction/positive axial direction
320 Exemplary (first) acceleration maximum (in positive axis direction) or (first) acceleration maximum plateau (in positive axis direction)
321 Exemplary (second) acceleration maximum (in negative axis direction) or (second) acceleration maximum plateau (in negative axis direction)
322 Exemplary (third) acceleration maximum (in positive axis direction) or (third) acceleration maximum plateau (in positive axis direction)
323 Exemplary (first) force change or force effort change, muscle activation potential change of the driving muscle (agonist)
324 Exemplary (second) force change or force effort change, muscle activation potential change of the inhibitory muscle (antagonist)
325 Exemplary (third) force change or force effort change, muscle activation potential change of the driving muscle (agonist)
326 Exemplary (fourth) force change or force effort change, muscle activation potential change of the inhibitory muscle (antagonist)
400 Exemplary ordinate, exemplary X-axis component of the location/position of the electronic pen as a function of time or phase
401 Exemplary ordinate, velocity of a/the writing operation
402 Exemplary ordinate, acceleration of a/the writing operation
403 Exemplary ordinate, force or force effort of a/the writing operation 404 Exemplary abscissa, e.g. time axis or phase angle over a period of 0 to $2\pi$ of a/the writing operation of an electronic pen 405 Exemplary X-axis component/X-axis component of an exemplary location signal or positional signal of an/the exemplary electronic pen writing operation, exemplary position signal profile of an exemplary electronic pen writing operation 406 Exemplary X-axis component/X-axis component of an exemplary velocity signal of an/the exemplary electronic pen writing operation, exemplary velocity profile of an exemplary electronic pen writing operation 407 Exemplary X-axis component/X-axis component of an exemplary acceleration signal of an/the exemplary electronic pen writing operation, exemplary acceleration profile of an exemplary electronic pen writing operation 408 Exemplary acceleration change, exemplary acceleration drop/acceleration increase in positive axis direction/positive axial direction 409 Exemplary (first) time offset/exemplary time span between a (first) pair of consecutive opposite acceleration changes 410 Exemplary acceleration change, exemplary acceleration drop/acceleration increase in negative axis direction/negative axial direction 411 Exemplary acceleration change, exemplary acceleration drop/acceleration increase in negative axis direction/negative axial direction 412 Exemplary (second) time offset/exemplary time span between a (second) pair of consecutive opposite acceleration changes 413 Exemplary acceleration change, exemplary acceleration drop/acceleration increase in positive axis direction/positive axial direction 414 Exemplary (first) acceleration maximum (in positive axis direction) or (first) acceleration maximum plateau (in positive axis direction) with a first amplitude 415 Exemplary (second) acceleration maximum (in negative axis direction) or (second) acceleration maximum plateau (in negative axis direction) with a second amplitude 416 Exemplary (third) acceleration maximum (in negative axis direction) or (third) acceleration maximum plateau (in negative axis direction) with a third amplitude 417 Exemplary (fourth) acceleration maximum (in positive axis direction) or (fourth) acceleration maximum plateau (in positive axis direction) with a fourth amplitude 418 Exemplary force profile or force effort profile, exemplary muscle activation potential of the hand or finger or arm muscles of a user when performing a/the exemplary writing operation with an electronic pen 419 Exemplary (first) force change or force effort change, muscle activation potential change of the driving muscle (agonist)

420 Exemplary (second) force change or force effort change, muscle activation potential change of the inhibitory muscle (antagonist)

421 Exemplary (third) force change or force effort change, muscle activation potential change of the driving muscle (agonist)

422 Exemplary (fourth) force change or force effort change, muscle activation potential change of the inhibitory muscle (antagonist)

423 Exemplary (first) amplitude
424 Exemplary (second) amplitude
425 Exemplary (third) amplitude
426 Exemplary (fourth) amplitude 427 Exemplary section of the exemplary acceleration profile along which the derivative is non-zero and where at any point of the section, the acceleration is not equal to zero, exemplary acceleration change 428 Exemplary section of the exemplary force profile/force effort profile along which the derivative is not equal to zero and wherein at each point of the section of the force is not equal to zero

What is claimed is:

1. An electronic pen with pen position detection, comprising
    a writing lead,
    at least one electric voltage source,
    at least one digital processing unit,
    at least one data transfer module, and
    an inertial position detection sensor system for determining a location and a movement of the electronic pen,
    wherein the electronic pen is configured for an initial specification of a writing coordinate system having an X-axis and a Y-axis orthogonal to the X-axis on a two-dimensional writing substrate and a Z-axis perpendicular to the two-dimensional writing substrate,
    wherein the inertial position detection sensor system is configured for determining at least one acceleration profile of the electronic pen along the X-axis and along the Y-axis for a plurality of pairs of different axis orientations of the X-axis and Y-axis on the writing substrate, whereby for each pair of axis orientations, the axis orientation of the X-axis and the axis orientation of the Y-axis are orthogonal to each other,
    wherein the digital processing unit is configured for determining a writing direction based on a determination of at least one characteristic property of the at least one acceleration profile, and
    wherein the determination of the at least one characteristic property comprises determining at least two time offsets between at least two pairs of consecutive and opposite acceleration changes of the at least one acceleration profile for a given orientation of the X-axis and a given orientation of the Y-axis from the plurality of pairs of different axis orientations of the X-axis and Y-axis, and the digital processing unit is configured for determining the pair of axis orientation of X-axis and orientation of Y-axis having the at least one characteristic property, wherein the time offsets are extremal and different from each other.

2. The electronic pen according to claim 1, wherein the digital processing unit is configured for determining a time offset between a pair of consecutive and opposite acceleration changes for a given orientation of the X-axis and a given orientation of the Y-axis, based on a first derivative of the at least one acceleration profile.

3. The electronic pen according to claim 2, wherein the digital processing unit is configured for determining the time offset between a pair of consecutive and opposite acceleration changes for a given orientation of the X-axis and a given orientation of the Y-axis from a time interval, wherein the first derivative and an absolute value of the at least one acceleration profile is equal to zero or about zero.

4. The electronic pen according to claim 1, wherein the determination of the at least one characteristic property comprises a determination of amplitudes of at least two consecutive and opposite acceleration changes of the at least one acceleration profile for a given orientation of the X-axis and a given orientation of the Y-axis from the plurality of pairs of different axis orientations of the X-axis and Y-axis, and wherein the digital processing unit is configured for determining the pair of axis orientation of the X-axis and orientation of the Y-axis that has the at least one characteristic property, and wherein a difference in the amplitudes are extremal and different from zero.

5. The electronic pen according to claim 1, wherein the digital processing unit comprises a programmed acceleration profile having at least one programmed characteristic property, and the digital processing unit compares the at least one acceleration profile with the programmed acceleration profile and determines that the at least one acceleration profile corresponds to the programmed acceleration profile when at least one of the orientations along one of the X-axis or the Y-axis of the acceleration profile has the at least one programmed characteristic property.

6. The electronic pen according to claim 5, wherein the programmed acceleration profile is defined by a translational writing pattern.

7. The electronic pen according to claim 1, wherein said initial specification of a writing coordinate system with two axes being orthogonal to each other and with the Z-axis is based on at least one of the following assumptions: the longitudinal axis of the electronic pen is not parallel to the direction of gravity, the surface of the writing substrate is oriented orthogonal to the direction of gravity, a user of the electronic pen is right-handed and/or left-handed, the writing direction is parallel to a border of the writing substrate, and the writing direction from a perspective of the user is from left to right or from right to left or from top to bottom.

8. A method for determining a writing direction of an electronic pen during writing on a two-dimensional writing substrate, comprising:
providing an electronic pen comprising a writing lead, at least one electric voltage source, at least one digital processing unit, at least one data transfer module, and an inertial position detection sensor system for determining a location and a movement of the electronic pen;
performing an initial specification of a writing coordinate system having an X-axis and a Y-axis orthogonal to the X-axis on a two-dimensional writing substrate and a Z-axis perpendicular to the two-dimensional writing substrate;
determining, via the inertial position detection sensor system, at least one acceleration profile of the electronic pen along the X-axis and along the Y-axis for a plurality of pairs of different axis orientations of the X-axis and Y-axis on the writing substrate, wherein for each pair of axis orientations, the axis orientation of the X-axis and the axis orientation of the Y-axis are orthogonal to each other;
determining at least one characteristic property by determining at least two time offsets between at least two pairs of consecutive and opposite acceleration changes of the at least one acceleration profile for a given orientation of the X-axis and a given orientation of the Y-axis from the plurality of pairs of different axis orientations of the X-axis and Y-axis, wherein the at least two time offsets are extremal and different from each other; and
determining a writing direction based on a determination of the plurality of pairs of orientation of X-axis and orientation of Y-axis having the at least one characteristic property along at least one of the X-axis or the Y-axis.

9. The method according to claim 8, wherein the time offsets between a pair of consecutive and opposite acceleration changes for a given orientation of the X-axis and a given orientation of the Y-axis are determined based on a first derivative of the at least one acceleration profile.

10. The method according to claim 9, wherein the time offsets between a pair of consecutive and opposite acceleration changes for a given orientation of the X-axis and a given orientation of the Y-axis are determined from a time interval, and wherein the first derivative and an absolute value of the at least one acceleration profile is equal to zero or about zero.

11. The method according to claim 8, wherein the at least one digital processing unit comprises a programmed acceleration profile having at least one programmed characteristic, and further comprising comparing the at least one acceleration profile with the programmed acceleration profile having at least one programmed characteristic and determining that the at least one acceleration profile corresponds to the programmed profile when at least one of the orientations along one of the X-axis or the Y-axis of the acceleration profile has the at least one programmed characteristic property.

12. The method according to claim 11, wherein the programmed acceleration profile is defined by a translational writing pattern.

13. The electronic pen according to claim 1, wherein the time offsets that are extremal comprise minimal time offsets, maximal time offsets, or minimal and maximal time offsets.

14. The electronic pen according to claim 6, wherein the translational writing pattern comprises a programmed word, a programmed translational periodic pattern, or a programmed word and a programmed translation periodic pattern.

15. The electronic pen according to claim 14, wherein the programmed translation periodic pattern comprises a garland.

16. The method of claim 12, wherein the translational writing pattern comprises a programmed word, a programmed translational periodic pattern, or a programmed word and a programmed translation periodic pattern.

17. The method of claim 16, wherein the programmed translation periodic pattern comprises a garland.

18. The electronic pen according to claim 1, wherein the digital processing unit comprises a programmed acceleration profile having at least one programmed characteristic property, and the digital processing unit compares the at least one acceleration profile with the programmed acceleration profile and determines that the at least one acceleration profile corresponds to the programmed acceleration profile when at least one of the orientations along one of the X-axis or the Y-axis of the acceleration profile has the at least one programmed characteristic property.

19. The method according to claim 8, wherein the at least one digital processing unit comprises a programmed acceleration profile having at least one programmed characteristic, and further comprising comparing the at least one acceleration profile with the programmed acceleration profile having at least one programmed characteristic and determining that the at least one acceleration profile corresponds to the programmed profile when at least one of the orientations along one of the X-axis or the Y-axis of the acceleration profile has the at least one programmed characteristic property.

20. The method according to claim 8, wherein determining the at least one characteristic property comprises a determination of amplitudes of at least two consecutive and opposite acceleration changes of the at least one acceleration profile for a given orientation of the X-axis and a given orientation of the Y-axis from the plurality of pairs of different axis orientations of the X-axis and Y-axis, and wherein the digital processing unit is configured for determining the pair of axis orientation of the X-axis and orientation of the Y-axis that has the at least one characteristic property, and wherein a difference in the amplitudes are extremal and different from zero.

* * * * *